(12) United States Patent
Nicholson

(10) Patent No.: US 6,766,329 B1
(45) Date of Patent: Jul. 20, 2004

(54) DYNAMIC PERSONALIZED INFORMATION ORGANIZER

(75) Inventor: Andrew L. Nicholson, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/494,716

(22) Filed: Jan. 31, 2000

(51) Int. Cl.[7] ............................................. G06F 17/00
(52) U.S. Cl. ..................... 707/102; 707/101; 715/513; 715/514; 715/515
(58) Field of Search ........................... 707/3, 4, 5, 500, 707/100, 101, 102, 103, 104.1; 715/513, 514, 515

(56) References Cited

U.S. PATENT DOCUMENTS

| | | | | |
|---|---|---|---|---|
| 5,659,723 A | * | 8/1997 | Dimitrios et al. | 707/103 R |
| 5,890,166 A | * | 3/1999 | Eisenberg et al. | 707/203 |
| 5,937,409 A | * | 8/1999 | Wetherbee | 707/103 R |
| 6,003,039 A | * | 12/1999 | Barry et al. | 707/103 R |
| 6,061,515 A | * | 5/2000 | Chang et al. | 707/100 |
| 6,119,102 A | * | 9/2000 | Rush et al. | 705/29 |
| 6,128,617 A | * | 10/2000 | Lowry | 707/100 |
| 6,154,213 A | * | 11/2000 | Rennison et al. | 707/103 |
| 6,314,422 B1 | * | 11/2001 | Barker et al. | 707/10 |
| 2002/0002571 A1 | * | 1/2002 | Manohar et al. | 707/526 |

OTHER PUBLICATIONS

Bush, V., "As We May Think", *The Atlantic Monthly*, vol. *CLXXVI*, A Magazine of Literature, Science, Art and Politics, 101–108, (Jul.–Dec., 1945).

* cited by examiner

*Primary Examiner*—Shahid Alam
*Assistant Examiner*—Isaac Woo
(74) *Attorney, Agent, or Firm*—Workman Nydegger

(57) ABSTRACT

A dynamic and personalized system for organizing data is disclosed. The system provides users the ability to organize addressable information by creating associations between the information independent from the information and from any other previously imposed organization of the information. The associations contain trigger and target addresses, and relationship between the data. A view in the association identifies how to interpret the relationship. Tools are provided to manage the associations, and several applications of the organization system are described such as associating personal notes, serial construction of documents, compound construction of documents, and group construction of documents.

37 Claims, 11 Drawing Sheets

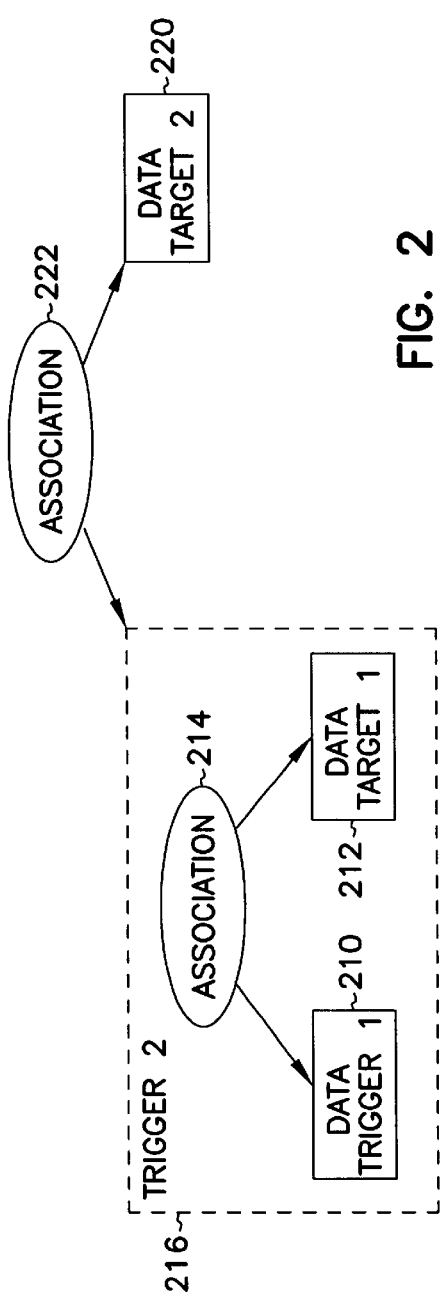

DYNAMIC PERSONALIZED INFORMATION ORGANIZER

FIELD OF THE INVENTION

This invention relates generally to a system for organizing information and in particular to a dynamic personalized information organizer.

BACKGROUND OF THE INVENTION

Organization of information is a very personal thing. Countless studies have shown that people think and organize data differently. An article by Vannevar Bush, entitled "As We May Think", published in the July 1945 issue of Atlantic Monthly describes how people associate information, and made a prediction of a machine for managing information based on an extension of what was known at the time. Mr. Bush wrote that the human mind operates by association. With one item in its grasp, it snaps instantly to the next that is suggested by the association of thoughts, in accordance with some intricate web of trails carried by the cells of the brain. It has other characteristics, of course; trails that are not frequently followed are prone to fade, items are not fully permanent, memory is transitory. Yet the speed of action, the intricacy of trails, the detail of mental pictures, is awe-inspiring beyond all else in nature.

Mr. Bush then proposed a futuristic device which is a mechanized private file and library called a memex. He describes a memex as a device in which an individual stores all his books, records, and communications, and which is mechanized so that it may be consulted with exceeding a speed and flexibility. It consists of a desk, and while it can presumably be operated from a distance, it is primarily the piece of furniture at which he works. On the top are slanting translucent screens, on which material can be projected for convenient reading. There is a keyboard, and sets of buttons and levers. Otherwise it looks like an ordinary desk.

Mr. Bush envisioned encyclopedias with a ready made mesh of associative trails running through them. This vision of the future predicts many of the navigational features of the Internet. He even describes the ability to insert comments, either linking it into a main trail or joining it by a side trail to a particular item. However, it describes a futuristic system where the user has their own copy of the all the information in order to properly catalog and associate it.

This points out several problems with existing computer systems and ways of organizing information. Constricting oneself to the organization of information by another can be very frustrating and result in slower use and assimilation of the information.

There are many ways of organizing information in known computer systems. One of the first ways of organizing information involves giving human readable names to addressable files which contain anything from computer programs to documents and images. The names may even be related to each other in a hierarchical manner, commonly known as a directory tree. Using a directory tree, programmers may place new programs in a directory under a "programs" directory to make them somewhat organized and easier to maintain. Users may then personalize the manner in which their information is stored by perhaps placing all their documents in a "my documents" directory with subdirectories for different categories of documents and other information the user wants to be able to find again.

One problem with this kind of organizational structure is that it is difficult to change the organization of the information. Many times programs have to be located in a certain directory for them to even operate. Further, the organization of much of the information is done by someone else. Each individual user may have a different desired way of organizing their own information. It is very difficult to personalize the organization of information using the existing ways of organizing information. It usually involves the user having their own copy of the information, leading to much duplication and little assurance that such copy is up to date. Further, as new information is developed, each user must then fit it into their personal organization infrastructure. Another problem is that the user must either have a specific organization that they use and remember well enough to know where to find a particular document or other copy of information. Some systems provide varying forms of indirect referencing, such as allowing the creation of shortcuts, which give the user the impression that the information is actually where they want it to be. These are very limited in their ability to actually provide a dynamic organizational structure that a user may desire.

The Internet and the world wide web provide a new layer of organization, allowing some form of organization among information contained in multiple computer systems coupled together by a network. Uniform resource locators (URLs) allow addressability of the information from any point on the network. Hypertext links are embedded in documents and other information to provide users the ability to jump to another document located anywhere on the web. These links are very beneficial. However, they always reflect someone else's organization of the information that is embedded in the information itself. It is common experience for people to start searching the web for information on one topic, and find themselves immersed in a completely different topic in a very short time.

Further prior ways to organize information on computer systems comprises the use of relational databases, where information can be categorized and sorted or searched by subject, author, and many other fields. This is similar to the card catalogs long used by libraries. It provides no ability to personalize the organization, other than by creating new fields which can be entered and then used to sort or search the data. Relationships between the entries in the database can be defined by the use of relational algebra. This, however, does not provide the ability to specify relationships beyond those algebraic relationships provided by the database. When a relational database is built, the expressions that can be built are normally fixed. The database may only be modified by a limited set of relational expressions. It can't be extended without extending the database. Also, it can't take data into it that does not fit as a value of some expression that the database allows to be modeled. Not only is the actual organization of the data limited by the available set of relationships, so is the appearance or view of the data (and the view of the organization of the data). Views and Organizations of data are interrelated. Typically data has to be organized according to some pre-defined system of relationships and users are limited to a corresponding vocabulary.

There is a need for a system which allows a user to create their own organization of information without having to have their own copy of all the information. There is a need to have the ability to create such an organization independent from other organizations of the information. There is a further need to be able to organize information without changing the information so that each user can have their own organization.

SUMMARY OF THE INVENTION

Dynamic and personalized organization of information on a computer system is enabled by use of associations. An association provides addresses, referred to as a trigger and a target, between two or more entities. It may also specify a relationship or organizational structure between them in addition to a temporal order implied by the trigger and target notation. The association may also specify a tool or module which can be used to interpret the organizational structure. Associations allow users to create independent, dynamic personalized organizations of information without having to have a copy of the all the information in their own personal storage, or having to modify the information. This can be done independent of preexisting organizations of the information to provide an organization of the information which is optimized for their own use. The personalized organization can also be shared with other users.

In one aspect of the invention, the trigger comprises a navigation map ID, which essentially points to an entry in a navigation map containing metadata identifying one or more targets. In essence, the navigation map represents them as a module, such as an educational course containing multiple entities. These entities for such a course might contain a lecture, text corresponding to the lecture, an example, and a series of questions and exercises to help consolidate the learning experience. By using associations, the module may be easily modified for individual students. This is accomplished by use of an assessment following completion of the module. Based on results of the assessment, other background entities may be integrated into a sequence of entities in a next module to create a customized set of associations identifying a customized module for each individual student.

Such a set of associations can also be implemented by adding metadata tags to the data and then searching for the appropriate values. However, this requires anticipating as many possible searches as may be eventually desired and authoring the appropriate metadata. Associations allow an author to create arbitrary organizations and a subsequent author (such as an instructor) to update them at any time without having to have a complete understanding of metadata and search techniques. Attempting to update metadata could result in breaking some other aspect of the system's expected behavior.

An application used to manage the modules, or the computer system running the application may implicitly create the associations. Further, user interfaces, such as a graphical user interface may be used by a user to explicitly create associations. In one version of the invention, icons representing the entities may be dragged and dropped onto other entities to identify the trigger and target.

The navigation map also contains metadata or information representative of the entire module, such as the name of the module, identification of the teaching assistant, the teaching assistant's email, telephone and office, and time requirements for the entire module. Further metadata representative of the module may also be created and stored in this data structure.

A further aspect of the invention involves the ability to use associations to indicate that a relationship exists without explicitly identifying the relationship. This provides an enhanced ability over databases that use predefined relational algebraic expressions to indicate a relationship between data elements. By using an association, a relationship may be simply said to exist, without the use of such relational algebra to precisely describe the relationship. This provides much more freedom in defining such ad-hoc relationships without the limitations present in relational databases.

Multiple associations from a single trigger are created in a further aspect of the invention. One trigger to an arbitrary number of targets is provided by a combination of tables supported by a relational database. A first table, referred to as a navigation table, serves as a trigger for the relationship, and also contains the metadata for multiple targets and optionally for individual associations. The navigation table or nav map contains an ID, which is contained in a second table of associations. This second table contains multiple targets corresponding to the ID of the nav map, and may also contain individual association metadata. By use of the two tables, a second level of indirection is provided, and duplication of metadata is avoided. The insertion of entities, such as the addition of an introduction into one of the modules discussed above is simplified over the single target association model in that only a single table needs to be modified rather than modifying and moving metadata in a string of associations.

Further characteristics of the associations comprise parameters that establish conditional relationships between pieces of information. These conditional relationships establish conditions for the appropriateness of the relationship based on a context in which the information is currently being used. Associations may be data structures such as objects or interrelated records in a relational database which are separate from the information or data that they associate. A document may appear in several locations in the organization that are representative of the various ways that the document is accessed and used, but only a single copy of the document need exist.

While the basic associations engine may support some built-in kinds of relationships, it's power lies in the ability to store arbitrary relationships and delegate interpretation of the relationship to some other entity whose identity is stored with the relationship.

Housekeeping information referred to as metadata contains information about the organizational structure provided by the associations. It includes an identification of the creator, the date each association was created, a lifetime of the association and access permissions specifying who can have access to the association. This housekeeping information has a variety of uses, including use in determining the appropriateness of the association for conditional relationships.

Several tools are provided that assist in the creation, management and usage of the organizational structures. Some of the tools include a create tool, which allows easy creation of associations independent from other organizations of the information. A find tool is used to find associations between information. A remove tool is used to remove a particular organizational structure.

A view tool is used to create an appropriate view of the association that represents the relationship between pieces of information identified by the association. A navigate tool is used to determine what to do when a user selects an association, such as simply navigating to another piece of information, or actually manipulating both pieces of information to provide a new piece of information.

An association manager creates associations dynamically based on use patterns. The association manager may create a link between two web pages when they are frequently accessed one after the other. A "next" button may be associated with the page that is usually accessed next. In browsers, the next button is only used when a user has gone back to a page previously viewed. By anticipating the organization of the user, the next button is now associated with the most likely path the user would follow.

BRIEF DESCRIPTION OF THE DRAWINGS

FIG. 2 is a block representation of two pieces of information organized by use of a separate data structure.

FIG. 3 is a block representation of a data structure used to associate pieces of information.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, an overview of associations between pieces of information is presented. In the third section, multiple tools for creating and using associations are described. A fourth section describes applications of associations to pieces of different types of information. Finally, in the fourth section, a conclusion of the detailed description is provided.

Hardware and Operating Environment

Figure 1:
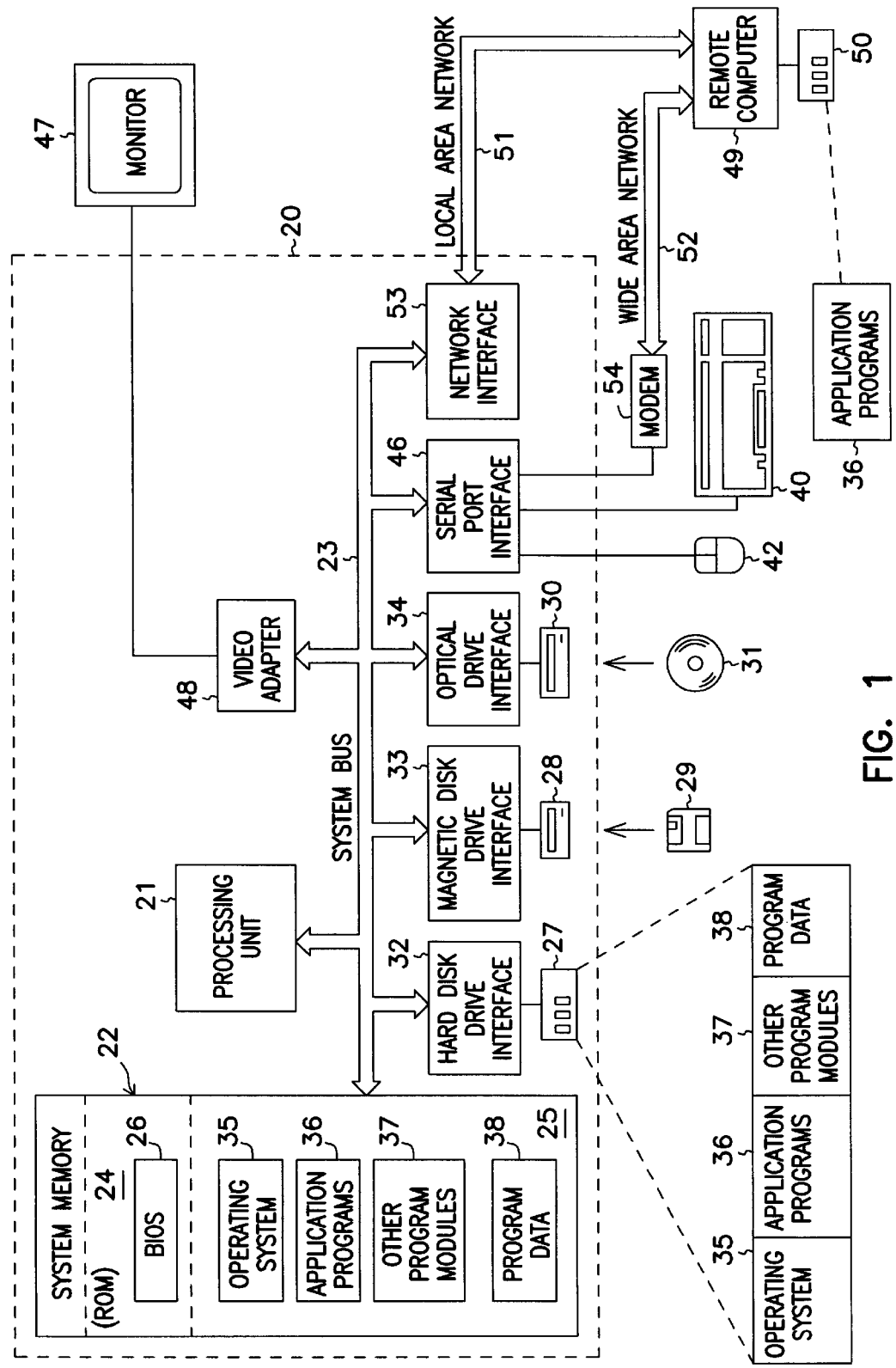
FIG. 1 is a block diagram representation of the hardware and operating environment in conjunction with which embodiments of the invention may be practiced.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node.

It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers, such as servers and the internet which contain vast stores of addressable information. One form of computer readable media comprises a carrier wave, one which programs may be transferred between computers.

Overview of the Invention

In this section of the detailed description, an overview of the invention, according to one embodiment of the invention, is provided. Those of ordinary skill within the art will appreciate, however, that the invention is not limited to this specific embodiment. The overview is presented in conjunction with FIG. 2 and FIG. 3.

In FIG. 2, a trigger data element or entity 210 is associated with a target data element 212 by means of an association structure 214. The association structure 214 contains at least an address of data element 210 and data element 212 and information regarding the organization or relationship between the two data elements. There is no need to specify the actual relationship between the entities. An order is implicit in that the trigger points at the target. Otherwise, the relationship may be completely arbitrary. The association can result in the creation of another data element, or means of constructing a data element 216, which comprises both the trigger and target, and also the association 214. This data element 216 is also shown as acting as a trigger data element which is related to a further data element 220 by the use of a further association structure 222. Association structure 222 contains an address of data element 216 and an address identifying data element 220 and the organization or relationship between the two data elements. Again, the relationship may be just the implicit order of reference, of may actually comprise a table of information describing the relationship as will be discussed with respect to FIG. 3. Using multiple layers of associations which are independent of the actual data elements to which they relate allows users to create an independent and personalized organization of addressable data elements regardless of where the data elements reside. There is no need to bring all the data into personally addressable storage in order to maintain the organization since the association identifies where the data resides. The data, or entities so organized may be brought into local storage when needed for viewing or other processing.

The use of association structures permits a user to create a dynamic navigation path between data that is separate and independent from any other imposed organization of the data. Thus, the user is free to organize the data in a way that makes the most sense to the user. Associations may be used to associate multiple layers of data, including already associated data as shown above.

Associations and their metadata can be partially explained using a file system analogy. The directories (or folders) in a file system allow a user to place arbitrary elements in a folder without specifying their relationship other than the fact that they are in the same folder. However, typically file systems store very limited metadata. In a system-of associations, directory entries would be associations and would have metadata about the association rather than the metadata for the file. Furthermore, since the association is itself a high-level object in the system, the association would have all the security attributes of a file. The most basic set of metadata on an association comprises attributes of files in file systems and may further contain information about the relationship. The typical file system is very limited in it's ability to manage metadata. Since the metadata for a file is stored in the directory entry (rather then with the file), creating a "link" in the file system to allow the file to appear in another directory creates a problem with finding the original metadata for the file. A system of associations works best if the metadata for an object is accessible from that object independent of the navigable path taken to access the object.

In view of the present invention, it would be possible to build a computer file system that exhibits the facilities of a system of associations. In essence, each user would have their own dynamic organizations and views of the data stored in the file system. Associations as a file system directly solve problems that have been encountered. Many web documents have "dependent files". These are files necessary to fully render the web document but are separate from the base document. The base document, being for instance, in html, contains the encoding of the relationships between the base document and the dependent files. Using traditional file systems, the base document is stored as html in a directory, and the dependent files are stored in a subdirectory with the same base name (e.g., dependent files of foobar.html are stored in the directory foobar). Only by understanding this convention can an application access the information properly, whereas with associations it would be an intrinsic service of the system and the relationships would be extracted and made explicit. A block representation of multiple associations is shown in FIG. 3 generally at 310. Associations may take the form of a data structure, such as an object, file, or as a row in a relational database which 310 is deemed to represent. The representation is shown in a relational database format with a row 312 of headings describing parameters contained in each of the columns of the database. Each row contains multiple fields containing values for the parameters which define an association structure. A target parameter 314 contains an address, such as a uniform resource locator (URL) which identifies an addressable data element or entity which is to be associated with another data element, whose address is contained in a trigger field 316. The addresses are URLs in one embodiment, which identify trigger or target data elements or information such as web pages, documents, and even a portion within a document if addressable. The address may also be local to the computer itself, such as a real address, a virtual address or an indirect reference. It is only important that the address clearly identify a piece of data or information clearly to underlying mechanisms that can find the referenced data.

A view field 318 identifies mechanisms to interpret the organizational structure defined by the association. It may comprise a pointer to program code or method to be used to navigate and view the target referenced by the association. It may also indicate code that combines the trigger and target, or even adds them to already viewed information.

A relationship field 320 contains parameter values that identify how a trigger and target are related. In one embodiment, the relationship may be specified as REL_LINK where the relationship is a link to a page on the Internet or elsewhere. It implies that a browser would be used to view the page. Another example comprises a REL_PAGENOTE relationship, which indicates that the relationship is a note on a document or page of a course text that contains user notes related to that portion of the text. The relationship helps define how the association is represented to the user. If it is REL_LINK, the association may be represented as a portion of highlighted text. In the case of a REL_PAGENOTE relationship, it may be represented as an icon in the margin of the text. Several other types of relationships will be readily apparent to those skilled in the art. For example, in a threaded discussion, the representation may be the first sentence of each of the discussion contributions in a list.

A conditional field 322 contains representations of conditions that need to be satisfied in order for the association to be shown to a user, or performed. Examples might include a date by which a target is to be made available, where the target includes answers to an educational test, which is the trigger. The condition is not true until the date of the test has passed. The conditional field could also reference any number of conditions which are easily programmable and could be quite complicated.

A creator field 324 identifies a creator of the association. This is useful in tracking personalized organizations of information. To find all the associations created by an individual, one need simply sort the associations by creator. This allows one to share associations with others, so one can get access to another organization of the information. In this manner, several different unique organizations can be created and used without modification to the underlying information.

A date created field 330 is used to identify the date that an association was created. It can then be used to maintain the associations, perhaps by pruning associations that are older than a predetermined date.

An access field 338 is used to provide information on access to information as well as specifying what a user can do with the data, including permissions. It can specify individual users, groups of users, general levels of users, as well as the permission to modify, read or write to the information.

A live field 342 is used to provide some means for specifying how long an association should exist. Much as the human brain forgets information that has not been accessed in quite some time, this field can provide similar least recently used information to an association manager. The field can also be used to specify that information is fundamental, and the association or path to it should remain despite not being used in quite some time.

Tools Used to Work With Associations

Several tools are used to help create and manage associations. Some are used by users, and others by the computer system based on user input. This section describes several of the tools and how they are used with respect to associations.

Figure 4:
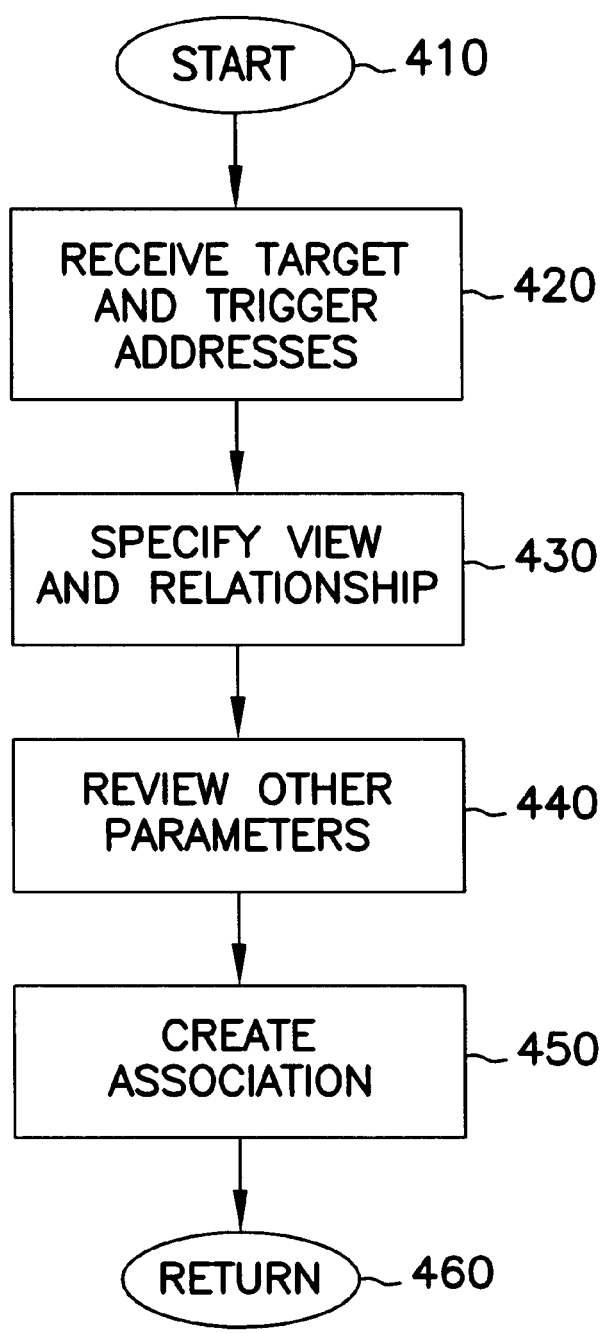
FIG. 4 is a flowchart of a create tool used to create the data structure of FIG. 3.

FIG. 4 shows the flow of a tool used to create a data structure as shown in FIG. 3. When an association is to be formed, the tool starts at 410, and then receives target and trigger addresses at 420. A view relationship may then be specified at 430. Other parameters are then reviewed at 440 to determine their values, and are added to the data structure. Users may be provided with an interface allowing them to select values for the parameters both on creation and upon editing existing associations. Many of the parameters may have default values, such as creator and date. Others may have sets of potential values which may be displayed to the user for selection. The tool may also be used by other programs to create associations at 450. Upon creation of the association, control is returned at 460.

Figure 5:
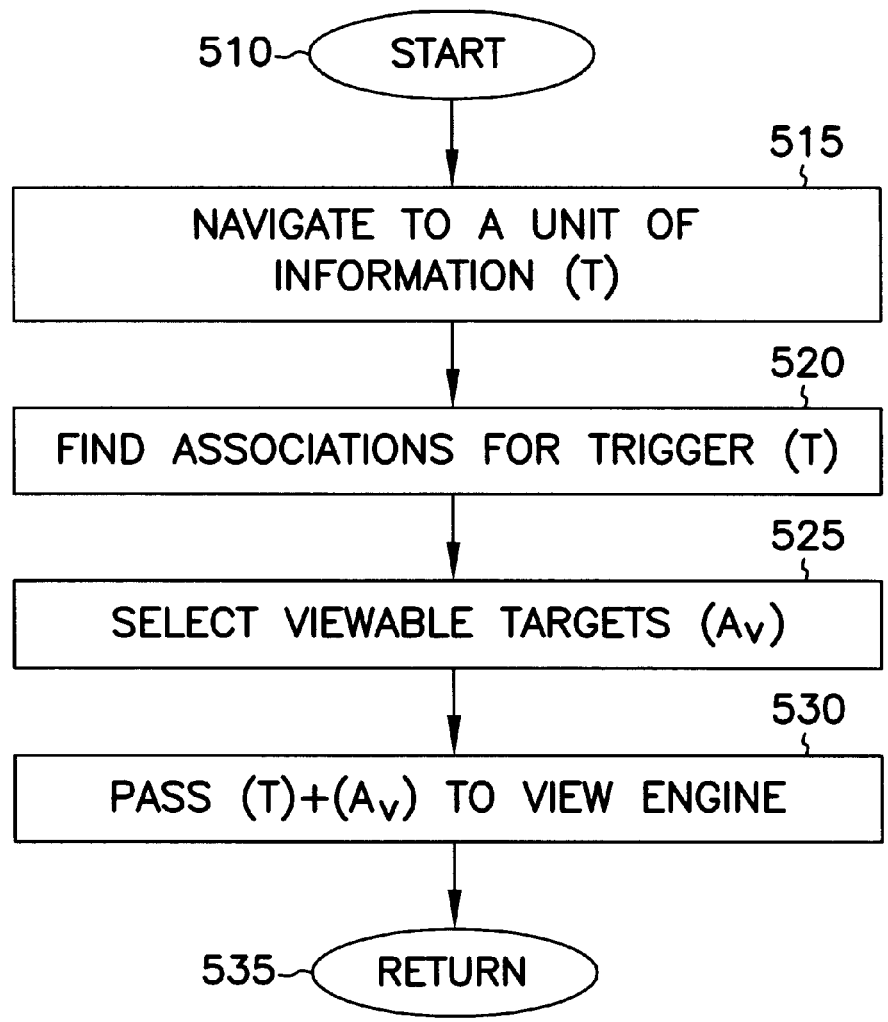
FIG. 5 is a flowchart of view tool used to create a visual representation of an association between pieces of information.

FIG. 5 illustrates the flow of a tool used to create a visual representation of an association between two pieces of information, starting at 510. At 515, navigation to a unit of information (T) is shown. At 520, associations for a trigger (T) are found, such as by referring to a data structure as shown in FIG. 3. Viewable targets ($A_V$) are then selected at 525, and both the trigger and viewable targets are passed to a view engine at 530. Control is returned at 535.

Figure 6:
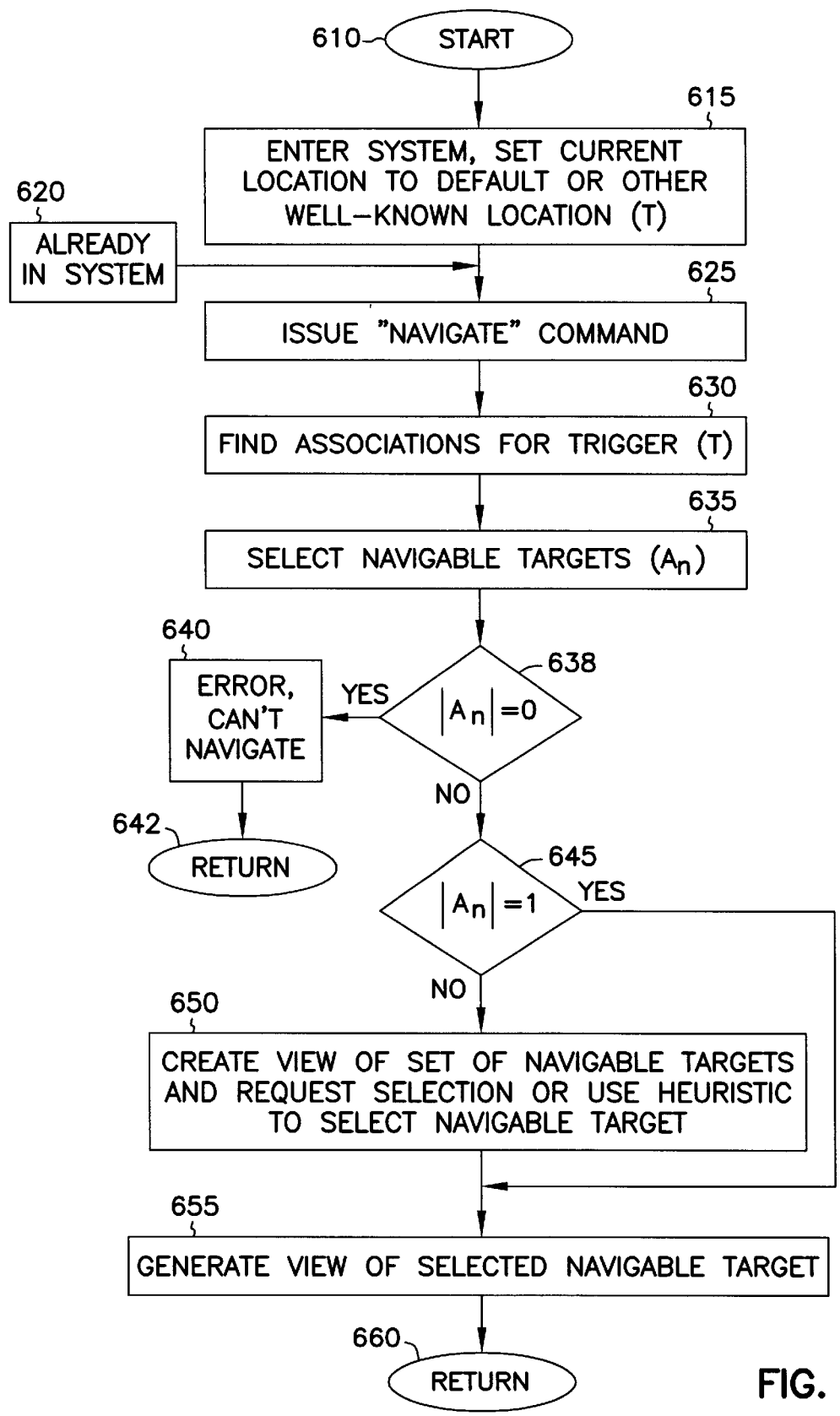
FIG. 6 is a flowchart of a navigate tool which interprets an association.

FIG. 6 shows the flow of a tool or set of tools used to interpret associations and provide navigation. The tool starts at 610, and the system is set to a current location, a default, or other well known location (T) at 615. A user may already be in the system as indicated at 620. Flow then proceeds from either 615 or 620 to 625, where a "Navigate" command is received. Upon receiving the "Navigate" command, associations for a Trigger (T) are found at 630 from the data structure. Navigable targets ($A_n$) are then selected at 635. If the number of members in set ($A_n$) is zero at 638, an error condition is noted at 640 because there is nothing to navigate to, and control is returned at 642. If the number of navigable targets is one, as indicated at 645, a view of the selected navigable target is generated at 655 and control is returned at 660. If there are more than one target in the set ($A_n$), then a view is created of the set of navigable targets and selection is requested at 650. Alternatively, a heuristic is used to select the navigable target, and the view of the selected target is generated at 655.

Figure 7:
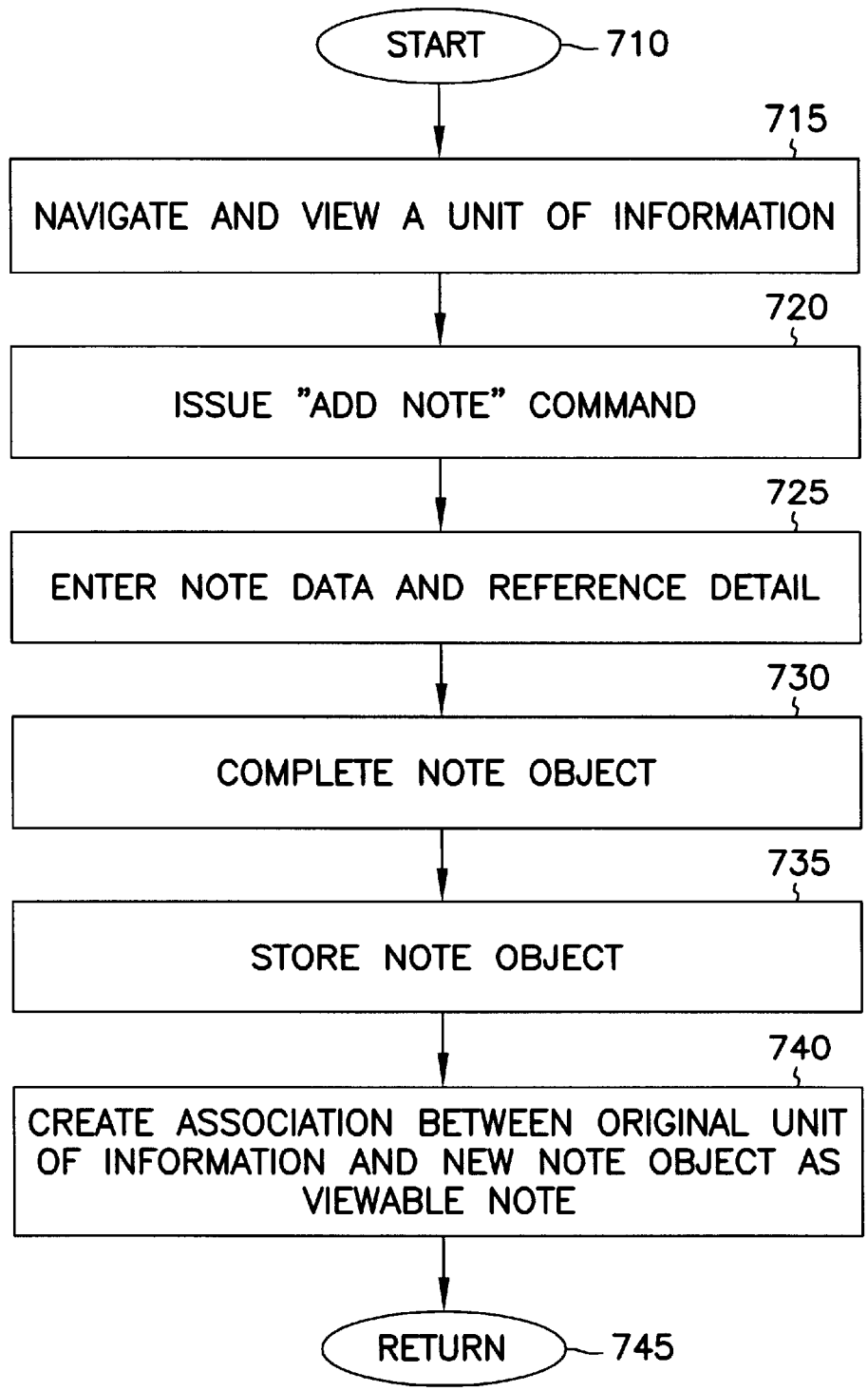
FIG. 7 is a flowchart illustrating the use of associations in the organization of notes related to a piece of information.

FIG. 7 is a flowchart illustrating the use of associations in the organization of notes related to a piece of information. Starting at 710, a unit of information is navigated to and viewed at 715. At 720, a user issues an "Add Note" or "Add Comment" command. Data corresponding to the note or comment is added, along with reference detail at 725. Note entry is then completed at 730, and a note object is stored at 735. An association is then created at 740 between the original unit of information and the note object as a viewable note. The trigger is the original information, and the note is the target. As previously indicated, the data structure is used to track the association.

Figure 8:
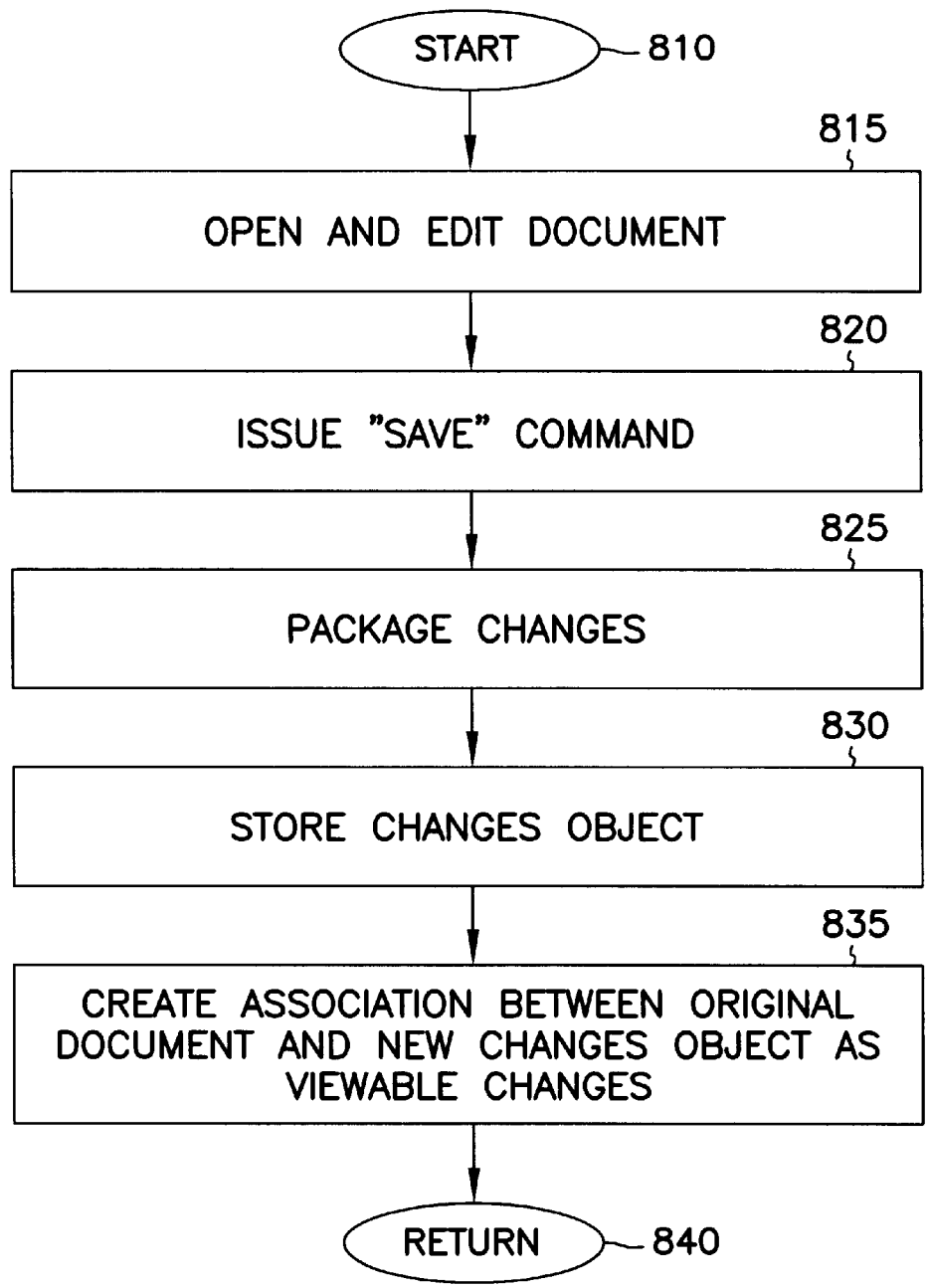
FIG. 8 is a flowchart showing the use of associations in the organization of serially constructed documents.

FIG. 8 shows the use of associations in the organization of serially constructed documents. Starting at 810, a document is opened and edited at 815. A save command may be issued at 820. The changes to the document are then packaged as an object at 825 and then stored at 830. At 835, an association between the original document and the new changes object is created as viewable changes. Control is returned at 840.

Figure 9:
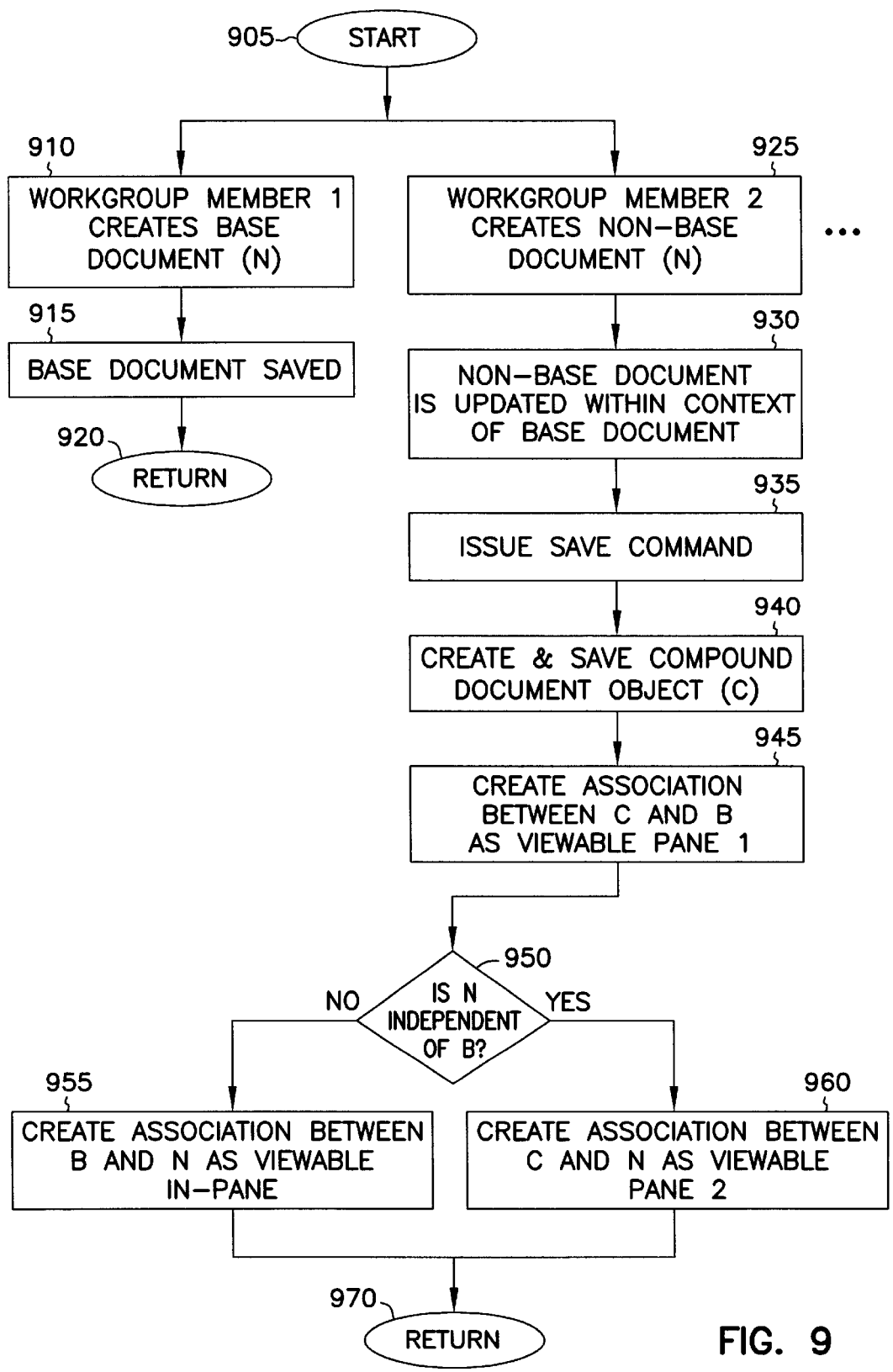
FIG. 9 is a flowchart illustrating the use of associations in the organization of compound document or information store.

FIG. 9 is a flow chart showing the use of associations in the organization of a compound document or information store starting at 905. A first workgroup member creates a base document (B) or information store at 910, and saves it at 915. Control is then returned at 920. A second workgroup member then creates a non-base document (N). At 930, the non-base document is updated within the context of the base document. A save command is issued at 935. At 940, a compound document object (C) is created and saved. An association is then created at 945 between C and B as a visual Panel. At decision block 950, it is determined whether N is independent of B. If yes, an association is created between C and N as a viewable Pane2 at 960. If not, an association between B and N as a viewable in-pane at 955. Control is returned at 970.

Figure 10:
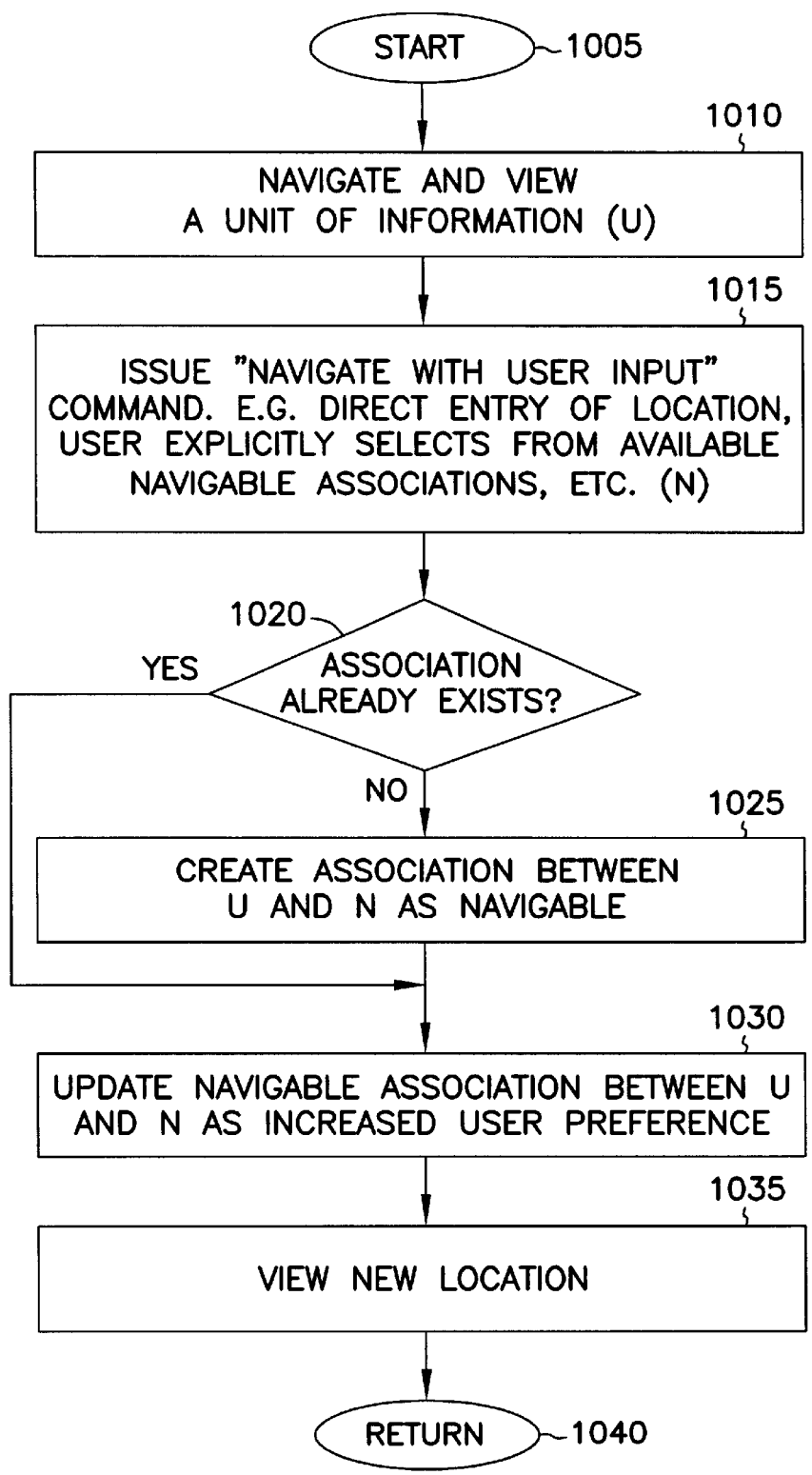
FIG. 10 is a flowchart of a module for automatically creating associations based on usage characteristics.

A flowchart shown in FIG. 10 depicts a module for automatically creating associations based on usage characteristics. Flow starts at 1005. A user may then navigate and view a unit of information (U) at 1010. A "Navigate with user input" command results in the direct entry of location that the user explicitly selects from available navigable associations (N). If an association does not already exist at 1020, an association between U and N is created as navigable at 1025. If it does already exist at 1020, or has been created at 1025, the navigable association between U and N is increased as a user preference. A count may be used to measure the preference relative to other preferences if desired. The count may decay with time, or simply related to counts in other navigable associations. Following increasing of the user preference for the association, the new location identified is provided for viewing at 1035. Control is then returned at 1040.

Figure 11:
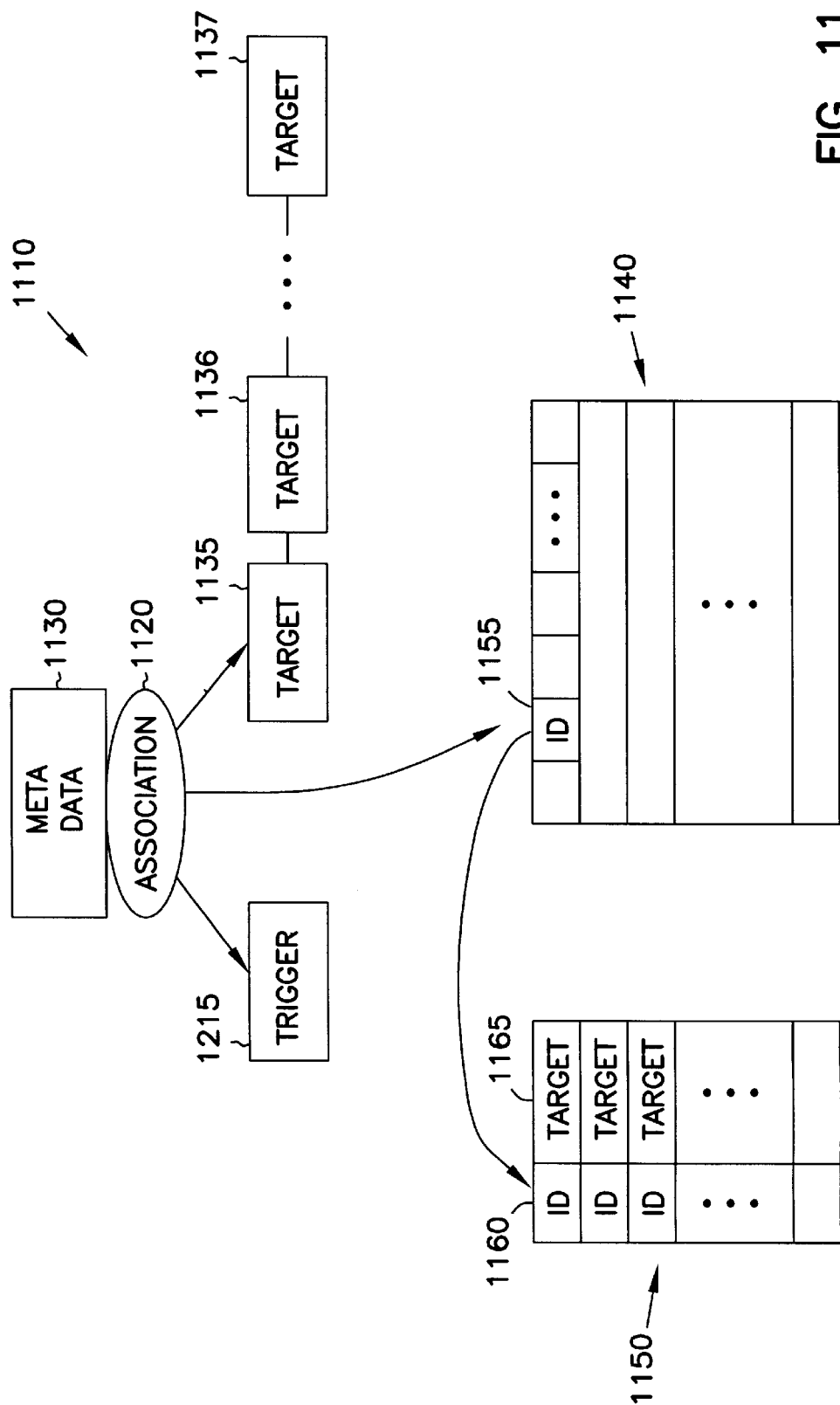
FIG. 11 is a block diagram of data structures used to manage multiway associations of entities.

A logical representation of one method of performing multiway association is shown in FIG. 11 generally at 1110. A trigger entity 1115 points to multiple targets through use of an association 1120. The association may contain metadata 1130 relating to the association between trigger 1115 and the first target 1135. In a multiway association, an arbitrary number of targets may be associated as indicated at 1136 and 1137. To keep track of them, and for navigating between them, a navigation table 1140 is provided. The navigation table is pointed to by association 1120. The navigation table points to an association table 1150 by use of a nav ID 1155. The nav ID points to a column of nav IDs 1160 in the association table 1150, each of which is part of a row containing targets 1165 corresponding to each nav ID. Several rows may have the same nav ID, with different targets represented in the second column. This provides the ability to have a multiway association without requiring a separate association for each logical association. Further, the navigation table 1140 contains metadata related to the multiway associations as opposed to individual associations. If the entities in such a multiway association comprise a series of parts or entities of an educational module, the metadata might contain information such as the course number, teaching assistant and other information related to the entities as a combination. This can result in a savings in storage space, and provides a cleaner and easier to update data structure. The multi-way association is an implementation convenience or optimization. As long as all the metadata for all members of a set of associations is identical, they may be compressed into a single association. The multi-way association uses a flag or other cardinal value to identify the target as being a collection of target identifiers. The target value is used to hash into a table of targets to find the targets of the multi-way association. The only difference between this method of multi-way association and the regular association is where the metadata is stored relative to the target identifier.

Applications of Associations

Figure 12:
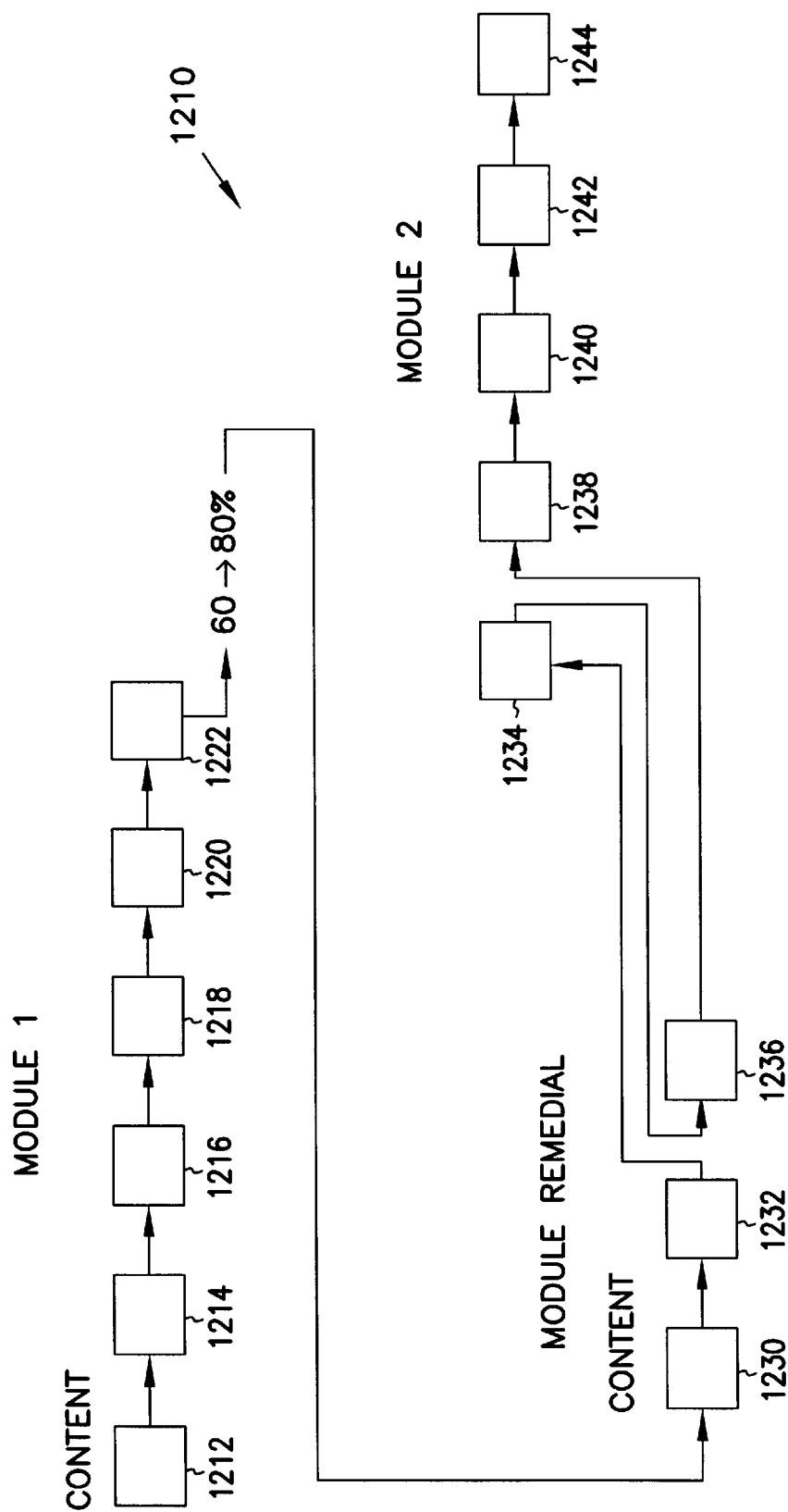
FIG. 12 is a block diagram showing associations created to modify an educational module based on an assessment of understanding of a previous module.

An example of a portion of an educational course is shown in FIG. 12 generally at 1210. Two educational modules are shown, each containing multiple entities or sections of the course which perhaps contain information such as a lecture, text material, exercises, or other instructional material. The first modules comprises entities 1212, 1214, 1216, 1218, 1220, and an assessment entity 1222. The entities are connected by lines with arrows, representing logical associations between them as previously described. The associations may be either direct one to one associations as first described, or of a multiway association, using a navigation table and association table as desired. Assessment entity 1222 may be a test, or other exercise designed to test the understanding of the student trying to learn the module. As indicated, a score of 60% to 80% correct indicates a passing grade, letting the student proceed to the next module. However, it also indicates that there may have been several sections or entities of the module that were not as well understood as desired.

A normal progression through module two would entail progressing through entities 1234, 1238, 1242 and 1244. However, based on the assessment, several remedial entities related to material not well understood may be easily added into the sequence of entities. Remedial content entities 1230 and 1232 are first presented to the student, followed by module two entity 1234, and then by remedial entity 1236 before finishing straight through the original organization of module two content. Again, the lines and arrows are representative of associations that have been made based on the assessment score. Such modules may be implicitly created by an application designed to present the content of the educational modules, simply by breaking the assessment into sections corresponding to remedial content and having a predetermined order of insertion into module two for such content where the assessment indicates that the content was not understood. An alternative way to create associations with the remedial content and the content of the second module is to have a teaching assistant or professor explicitly create the associations to provide an individualized customization of the content for the student.

Note that this becomes a new method of writing programs. Typically this kind of application would involve specific program code to interpret the results of the assessment and hardwire the instructional path for the student. Using the conditional associations the author specifies the relationships between the data (in a simple, intuitive, and largely ad-hoc manner) and a generic program engine interprets the relationships on the fly to deliver the desired behavior. Further, personalized behaviors are made available by altering the data without altering the program code. Using the extension capability of the ad-hoc relationship interpreters, sophisticated authors can still create "code" that interprets the relationships. The nature of the "code" is not limited to our current notion of how we write programs today so it is possible to develop a tool that makes authoring the "code" extremely simple. The "code" is run and simply returns the "next" navigable location.

All students in the same class may start with the same map of the course content. Synchronization constructs are not required where an association is created that has no place to go in a users map. For example, the answers to a test should not be viewable to anyone other than the professor or instructor. An association may be created for a note, created with an editor, may also have access permissions which may be modified by the creator. The system takes the association and adds it to the other people's maps. An email has just been effectively sent without using an email system. Receivers of the "email" can add notes and in essence create a threaded discussion. Someone might make a note on a note. They are always organized. An N way association can also be used to represent a threaded discussion. Logically, N way associations can be represented by using multiple two way associations. Multiway associations provide an optimization that allows efficient transformations.

The view relationship is something that identifies the function used to create a presentation of the trigger and the target together. In the threaded discussion model, the topic, and first sentence of each of the messages or notes may be displayed.

Several other methods of implicit customization may be used as desired. Further, explicit creation of associations may be performed using graphical user interfaces, where entities are represented by icons. To create the association, a target is simply dragged onto a trigger. This will invoke an association method, which will create the mapping required to identify the target from a trigger, and also prompt for entry of metadata for storage in tables using an underlying relational database. Associations may also be created by invoking the association method directly, and then specifying the trigger and target and metadata in either a prompted or fill in a table manner. Either such methods are easily implementable by one skilled in the art.

Associations may also be used to: "Show me everything that I think is related to John Foobar" or even "Given what I've been doing, get me the information related to John Foobar that is most likely to be interesting to me now". For example, if calldowns on beta program participants are being done, a calldown program might be launched and start off at the first person in a list needed to be called. Clicking a next button causes automatic dialing of and connecting to that person. A status update dialog box may also be popped up. Clicking the next button again (same button) causes the system to jump to the record for the next person to be called. Also, if anything was entered in the dialog, the status is updated appropriately so that person does or does not show up again during this calldown (as well as saving the status information). This provides a so-called "intuitive" interface that does what a user expects, regardless of how the buttons are labeled or anything else. The most intuitive and easy-to-use interface only needs one button—"next". Most user interfaces are hard to use because searching through available menus to find a button that most closely resembles a desired action can be tedious. A first-order solution is to filter available options to the system's best guess about what you might want to do next based on past usage, and then present such options to the user. A further example of the use of associations in providing educational materials involves a professor who has new content in location X. The professor can insert it, and all organizations get dynamically updated. Text may be highlighted, and an association may be created. The association may be represented by a next button, or in the case of highlighting, a variable may be set that indicates highlighting is not desired. But, at another point, highlighting may be turned on.

A piece of email may also reference back to highlighted text. It could be a note or anything desired. Now the sense has been created that a user is navigating through, the student may see a box with a question mark. Now, when a reply is created, another association is created between a new email, and the original email.

Associations also allow the creations of multiple views of all the different data. Having an inbox would be a different view. An inbox would be a different way of looking at the information space. Replies or threaded discussions can then be associated.

Conclusion

A system for providing dynamic and personalized organization of information has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

In computer science, data and functions are two fundamental ideas. The present invention adds organization as a separable element. The organization is taken out of the data. The organization in effect becomes the associations that may be stored and processed independently of the data. By just sending an association (an organization of the data) the receiver can get all the data and understand how to process the data. This is counterintuitive because users tend to organize data to obtain the most efficient function. However, if multiple different functions are to be applied to the data, then it makes great sense to separate the organization of the data.

I claim:

1. A method of organizing data accessible by a computer, allowing for personalized organization of the data which may be independent of one or more other organizations of the data, without needing separate copies of the data for each organization, the method comprising:

forming a data structure;

automatically and dynamically creating a navigation path between data that is separate and independent, based at least in part upon navigation to the data, wherein the navigation path is automatically and dynamically created by performing acts that include:

upon navigating to a particular data, inserting an entity reference as a trigger in the data structure corresponding to the particular data;

upon one of navigating to a new data and creating new data, inserting an entity reference as a target in the data structure corresponding to the new data;

storing the data structure as an association between the trigger and target; and inserting one or more criteria in the data structure that determine the circumstances under which the association between the trigger and target applies and, the association corresponding to a user preference for navigating between the trigger and target; and upon storing the association, automatically modifying the association in response to subsequent navigation between the trigger and target.

2. The method of claim 1 and further comprising tracking usage patterns between triggers and targets.

3. The method of claim 1 wherein the data structure provides a personalized organization of the pre-organized information.

4. The method of claim 1 wherein the trigger entity is different than the target entity.

5. A method as recited in claim 1, wherein the trigger entity reference identifies a base document, and where the target entity reference identifies a set of modifications to the base document.

6. A method as recited in claim 5, wherein the set of modifications to the base document are stored as an object.

7. A method as recited in claim 5, wherein the method further comprises creating an association for each of multiple successive changes to the base document to create a temporal chain of modifications.

8. A method as recited in claim 1, wherein the trigger and target entity references comprise educational course modules, including sequential modules and one or more remedial content modules, and wherein the one or more criteria determine the order of presentation for the educational course modules, based on performance within the otherwise sequential modules.

9. A method as recited in claim 1, wherein the target comprises a reference to new data that is created as a note entry while the particular data that was navigated to is being viewed.

10. A method as recited in claim 1, wherein the target comprises a reference to new data that is created as a note entry while the particular data that was navigated to is being viewed.

11. A method as recited in claim 1, wherein creating the navigation path further includes providing an interface for a user to select the one or more criteria.

12. A method as recited in claim 1, wherein the user preference affects a selection of the target for subsequent presentation to a viewer from a plurality of other targets that each have an association with the trigger.

13. A method as recited in claim 12, wherein modifying the arbitrary association includes increasing the user preference for navigating between the trigger and target.

14. A method as recited in claim 12, wherein the user preference is automatically decreased by a passage of time.

15. A method as recited in claim 1, wherein the data structure includes a field for defining a period of time for which the association will exist.

16. A computer readable medium having computer instructions stored thereon for causing a computer to perform a method of organizing data that allows for personalized organization of the data which may be independent of one or more other organizations of the data, without needing separate copies of the data for each organization, the method comprising:

forming a data structure;

automatically and dynamically creating a navigation path between data that is separate and independent, based at least in part upon navigation to the data, wherein the navigation path is automatically and dynamically created by performing acts that include:

upon navigating to a particular data, inserting an entity reference as a trigger in the data structure corresponding to the particular data;

upon one of navigating to a new data and creating new data, inserting an entity reference as a target in the data structure corresponding to the new data;

storing the data structure as an association between the trigger and target; and inserting one or more criteria in the data structure that determine the circumstances under which the association between the trigger and target applies and, the association corresponding to a user preference for navigating between the trigger and target; and upon storing the association, automatically modifying the association in response to subsequent navigation between the trigger and target.

17. A computer program product as recited in claim 16, wherein the method further comprises tracking usage patterns between triggers and targets.

18. A computer program product as recited in claim 16, wherein the data structure provides a personalized organization of the pre-organized information.

19. A computer program product as recited in claim 16, wherein the trigger entity is different than the target entity.

20. A computer program product as recited in claim 16, wherein the trigger entity reference identifies a base document, and where the target entity reference identifies a set of modifications to the base document.

21. A computer program product as recited in claim 20, wherein the set of modifications to the base document are stored as an object.

22. A computer program product as recited in claim 20, wherein the method further comprises creating an association for each of multiple successive changes to the base document to create a temporal chain of modifications.

23. A computer program product as recited in claim 16, wherein the trigger and target entity references comprise educational course modules, including sequential modules and one or more remedial content modules, and wherein the one or more criteria determine the order of presentation for the educational course modules, based on performance within the otherwise sequential modules.

24. A computer readable media as recited in claim 16, wherein the target comprises a reference to new data that is created as a note entry while the particular data that was navigated to is being viewed.

25. A computer readable medium, as recited in claim 16, wherein the wherein the data structure includes a field for defining a period of time for which the association will exist.

26. A computer readable medium, as recited in claim 16, wherein the user preference affects a selection of the target for future presentation to a viewer from a plurality of other targets that each have an association with the trigger.

27. A computer readable medium, as recited in claim 26, wherein modifying the arbitrary association includes increasing the user preference for future navigation between the trigger and target.

28. A computer readable medium, as recited in claim 26, wherein the user preference is automatically decreased by a passage of time.

29. A computer readable medium storing a data structure for organizing relationships between addressable data, wherein the data structure allows for personalized organization of the data that may be independent of one or more other organizations of the data, without needing separate copies of the data for each organization, the data structure having fields comprising:

an entity reference pointing to a trigger entity;

an entity reference pointing to a target set of data; and one or more criteria that determine the circumstances under which an association between the trigger entity and the target set of data applies, wherein the entity references and the one or more criteria are created automatically and dynamically, based at least in part upon navigation to the data, by performing acts that include:

upon navigating to a particular data, inserting an entity reference as the trigger in the data structure corresponding to the particular data;

upon one of navigating to a new data and creating new data, inserting an entity reference as the target in the data structure corresponding to the new data;

storing the data structure as the association between the trigger and target; and inserting the one or more criteria in the data structure;

the association corresponding to a user preference for navigating between the trigger and target; and upon storing the association, automatically modifying the association in response to subsequent navigation between the trigger and target.

30. A computer readable medium as recited in claim 29, wherein the trigger entity reference identifies a base document, and where the target entity reference identifies a set of modifications to the base document.

31. A computer readable medium as recited in claim 30, wherein the set of modifications to the base document are stored as an object.

32. A computer readable medium as recited in claim 29, wherein the trigger and target entity references comprise educational course modules, including sequential modules and one or more remedial content modules, and wherein the one or more criteria determine the order of presentation for the educational course modules, based on performance within the otherwise sequential modules.

33. A computer readable media as recited in claim 29, wherein the target comprises a reference to new data that is created as a note entry while the particular data that was navigated to is being viewed.

34. A computer readable medium, as recited in claim 29, wherein the wherein the data structure includes a field for defining a period of time for which the association will exist.

35. A computer readable medium, as recited in claim 29, wherein the user preference affects a selection of the target for subsequent presentation to a viewer from a plurality of other targets that each have an association with the trigger.

36. A computer readable medium, as recited in claim 35, wherein modifying the arbitrary association includes increasing the user preference for navigating between the trigger and target.

37. A computer readable medium, as recited in claim 35; wherein the user preference is automatically decreased by a passage of time.

* * * * *